BEST AVAILABLE COPY
T862,000
May 6, 1969
D. E. B. MORGANS
DEF. PUB.
SHAPED ARTICLES OF FLUORINE-CONTAINING POLYMERS FILLED WITH CARBONACEOUS MATERIAL
SN - 768945
Original Filed Nov. 23, 1966
BEST AVAILABLE COPY
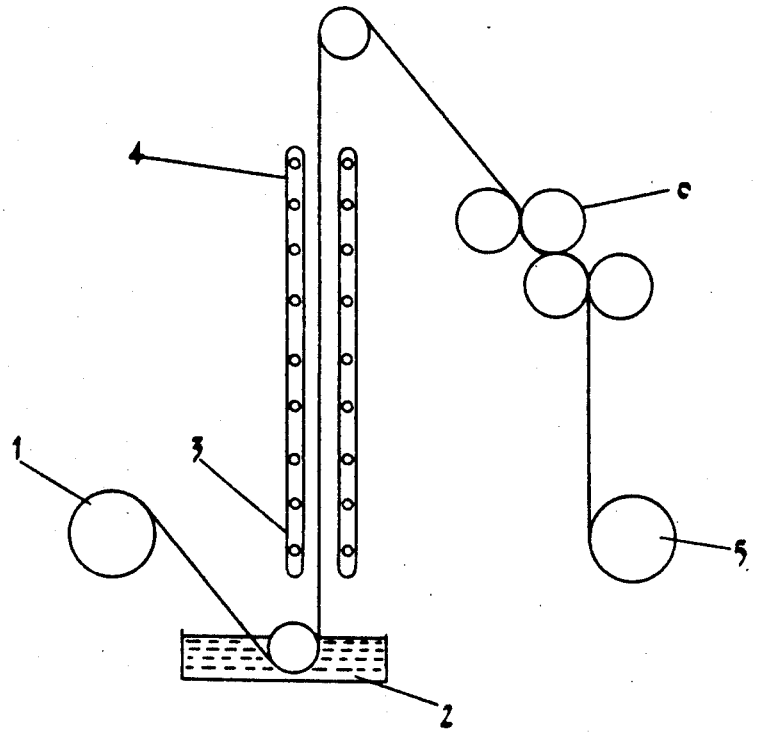
INVENTOR
DAVID EVAN BRYAN MORGANS
By Cushman, Darby & Cushman
ATTORNEYS